(12) United States Patent
Rubin

(10) Patent No.: US 8,103,600 B1
(45) Date of Patent: Jan. 24, 2012

(54) GRAPHIC USER INTERFACE HAVING MENUS FOR DISPLAY OF CONTEXT AND SYNTAX USEFUL IN AN ARTIFICIAL INTELLIGENCE SYSTEM

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 369 days.

(21) Appl. No.: 12/390,642

(22) Filed: Feb. 23, 2009

(51) Int. Cl.
*G06F 17/00* (2006.01)
(52) U.S. Cl. .................... 706/11; 715/853; 707/805
(58) Field of Classification Search .............. 715/853; 706/11; 707/805
See application file for complete search history.

(56) References Cited

U.S. PATENT DOCUMENTS

| | | | | |
|---|---|---|---|---|
| 5,329,612 | A * | 7/1994 | Kakazu et al. ................ | 706/59 |
| 5,367,619 | A * | 11/1994 | Dipaolo et al. ............. | 715/221 |
| 5,727,130 | A * | 3/1998 | Hung ............................ | 706/13 |
| 5,809,492 | A * | 9/1998 | Murray et al. ............... | 706/45 |
| 5,974,405 | A * | 10/1999 | McGuinness et al. ........ | 706/45 |
| 6,233,686 | B1 * | 5/2001 | Zenchelsky et al. ............ | 726/1 |
| 7,047,226 | B2 | 5/2006 | Rubin | |
| 7,047,488 | B2 * | 5/2006 | Ingersoll et al. ............. | 715/235 |
| 7,188,316 | B2 * | 3/2007 | Gusmorino et al. .......... | 715/764 |
| 2004/0153427 | A1* | 8/2004 | Hungar et al. ................. | 706/47 |
| 2004/0221242 | A1* | 11/2004 | Chen et al. .................... | 715/810 |
| 2005/0033770 | A1* | 2/2005 | Oglesby et al. ............ | 707/104.1 |
| 2008/0097748 | A1* | 4/2008 | Haley et al. ....................... | 704/9 |

OTHER PUBLICATIONS

IMSE-CNM, Fuzzy Logic Design Tools: Xfuzzy 3.0, pp. 7, 8, and 24-31, available at http://www2.imse-cnm.csic.es/Xfuzzy/Xfuzzy_3.0/Xfuzzy3.0_en.pdf (2003).*
Kabbaj, Adil, Dynamic Ontology GUI, available at http://replay.waybackmachine.org/20081103234354/http://amine-platform.sourceforge.net/component/Guis/LexiconOntologyGUI.htm (Feb. 2008) (archived Feb. 14, 2009).*
SQL Get Rule Assoc From Cube, M2K (Music-to-Knowledge), IMIRSEL, available at http://web.archive.org/web/20071014050747/http:/www.music-ir.org/evaluation/m2k/release/docs/ncsa/d2k/modules/core/discovery/ruleassociation/SQLGetRuleAssocFromCube.html (archived Feb. 14, 2009).*
U.S. Appl. No. 11/854,638, Rubin.

(Continued)

*Primary Examiner* — Doon Chow
*Assistant Examiner* — Conrad Pack
(74) *Attorney, Agent, or Firm* — Kyle Eppele; J. Eric Anderson

(57) ABSTRACT

A graphical user interface (GUI) is used for rendering semantic concepts and provides menu selections that are rendered in accordance with the semantic concepts. The display includes fields for rendering logical associations in multiple display fields. A first field is provided for a semantic concept, and a second field is provided for receiving a consequent of the semantic concept. First and second menus are used to display the semantic concept in a hierarchical display of a set of semantic concepts and to display consequents corresponding to the semantic concepts. A third field for display a semantic concept and a fourth field displays a consequent of the semantic concept. If a user makes a selection from one of the first and second menus, the GUI renders displays in the third and fourth fields in accordance with the selection.

3 Claims, 2 Drawing Sheets

OTHER PUBLICATIONS

Escardo, M., "Complexity considerations for hash tables", Jan. 12, 2006, online: "http://www.cs.bham.ac.uk/~mhe/foundations2/node92.html" taken Dec. 15, 2008.

Rubin, S., et al., "Learning Using an Information Fusion Approach", Proc. of the ISCA Int'l Conference on Intelligent and Adaptive Systems, Nice, 2004.

Chaitin, G.J., "Randomness and Mathematical Proof", Sci. Amer., vol. 232, No. 5, pp. 47-52, 1975.

Zadeh, L.A., "From Computing with Numbers to Computing with Words . . . ," IEEE Trans. Ckt. and Systems, vol. 46, No. 1, pp. 105-119, 1999.

Rubin, S.H., et al., "On the Role of Informed Search in Veristic Computing", Proc. 2001 IEEE Int. Conf. Syst., Man, Cybern., pp. 2301-2308, 2001.

Rubin, S.H., et al., "KASER: Knowledge Amplification by Structured Expert Randomization", IEEE Trans. Syst., Man, Cybern.: Part B, vol. 34, No. 6m Dec. 2004, pp. 2317-2329.

Rubin, S.H., "On randomization and discovery", Information Sciences, vol. 177, pp. 170-191, Jan. 2007.

* cited by examiner

GRAPHIC USER INTERFACE HAVING MENUS FOR DISPLAY OF CONTEXT AND SYNTAX USEFUL IN AN ARTIFICIAL INTELLIGENCE SYSTEM

FEDERALLY-SPONSORED RESEARCH AND DEVELOPMENT

This invention (Navy Case No. 099109) was developed with funds from the United States Department of the Navy. Licensing inquiries may be directed to Office of Research and Technical Applications, Space and Naval Warfare Systems Center, San Diego, Code 2112, San Diego, Calif., 92152; telephone (619)553-2778; email: T2@spawar.navy.mil.

BACKGROUND

1. Field

This disclosure relates generally to a computer graphical user interface (GUI). More particularly, this disclosure pertains to an associative memory GUI for an artificial intelligence system.

2. Background

A Graphical User Interface (GUI) is a user interface which allows people to interact with electronic devices such as computers. A GUI offers graphical icons, and visual indicators as opposed to text-based interfaces, typed command labels or text navigation to fully represent the information and actions available to a user. The actions are usually performed through direct manipulation of the graphical elements by another user interface device such as a keypad or mouse, but can also permit apparently direct interaction through a touch screen.

GUIs offer advantages in a wide variety of interface applications, including applications which involve the communication of language and syntax over the user interface. Particular types of operation which use communication are artificial intelligence (AI) systems and expert systems. An example of an expert system is a Knowledge Amplification by Structural Expert Randomization (KASER) system. The KASER is a knowledge amplifier based on the principle of randomization. This principle refers to the use of fundamental knowledge in the capture and reduction of a larger, dependent space of knowledge (not excluding self-reference). In a KASER system, the user supplies declarative knowledge in the form of a semantic tree using single inheritance. Unlike conventional intelligent systems, however, KASERs are capable of accelerated learning in symmetric domains.

SUMMARY

A graphical user interface (GUI) renders logical associations in multiple display fields. A first field is provided for a semantic concept, and a second field is provided for receiving a consequent of the semantic concept. First and second menus are used to display the semantic concept in a hierarchical display of a set of semantic concepts and to display consequents corresponding to the semantic concepts. A third field displays a semantic concept and a fourth forth field displays a consequent of the semantic concept. In that manner, a user selection from a corresponding one of the first menu and the second menu renders a display in the corresponding one of the third and fourth fields and a corresponding rendering in the other one of the third and fourth fields in accordance with menu selections in the first and second menus.

DETAILED DESCRIPTION

Figure 1:
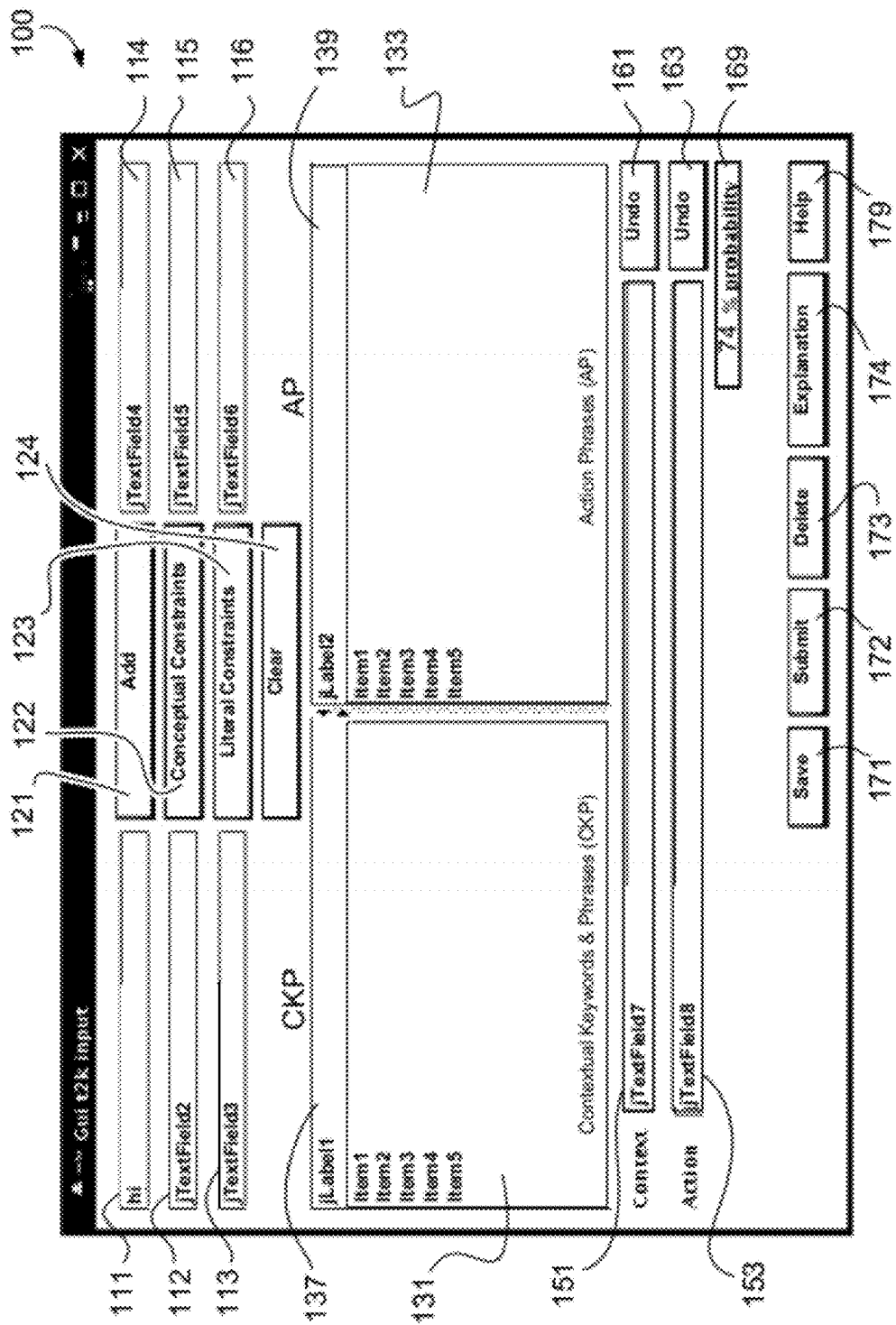
FIG. 1 is a diagram depicting an example graphical user interface (GUI).

The present system addresses a desire to present a graphical-user-interface (GUI) in support of a decision support system such as that disclosed in U.S. patent application Ser. No. 12/390,633, filed 23 Feb. 2009, titled System and Method for Type 2 KASER (Knowledge Amplification by Structured Expert Randomization) by S. H. Rubin, which is incorporated by reference herein in its entirety. In order to provide information between the user and the KASER during the learning process, the present approach is to combine information science and cognitive science in the form of several virtual and physical multimedia screens. The screens can be, by way of non-limiting examples, a whiteboard running a pen-based OS ensemble, a menu-driven touch-screen, or a multimedia output screen. If a touch screen is used, the touch screen may also facilitate navigation between virtual screens. An application to homeland security is provided as an example; however, the approach has applicability to many problems in which a graphical form of learning is required.

It is desired that the integration between human and machine be seamless, which allows the user to pose questions and retrieve answers through the multimedia system, thus accelerating the learning process.

As a synopsis of the presently inventive KASER, a production rule is defined to be an ordered pair whose first member is a set of antecedent predicates and whose second member is an ordered list of consequent predicates. Predicates can be numbers or words. The linking of the two members forms rules or courses of action. The rules may be of the form, $\{i, j, k, \ldots\} \rightarrow (u\ v\ w)$, where the antecedent consists of a non-empty, sorted set of distinct positive integers and the consequent consists of a non-empty sequence of positive integers—including the normalized insertion (INS) and erasure (ERA) commands and their arguments. The context has the same format as the antecedent. Positive integers are translated to and from their textual menu equivalents through the use of hash tables.

KASER systems can be classified as Type 1 or Type 2, depending on their characteristics. In a Type 1 KASER, words and phrases are entered through pull-down menus. The user is not allowed to enter new words or phrases if a semantically-equivalent phrase already exists in the menu. In a Type 2 KASER, distinct syntax may be equated to yield the equivalent normalized semantics. The idea in a Type 2 KASER is to ameliorate the inconvenience of using a data entry menu with scale. In a Type 2 KASER, selection lists are replaced with semantic equations from which a list problem is automatically solved. The relative validity of all non-trivial knowledge (i.e., knowledge capable of self-reference) is relative and varies with domain and time. In the Type 2 KASER system, transformation may be used to induce symmetric rules. Transforms serve to creatively transform and thus dynamically normalize contexts and rule antecedents, which in turn facilitates the transformative induction of new knowledge. Creative transformations are created by pairing rule antecedents having a common consequent such that the direction of transformation is always towards the more likely to be valid. Likewise, transforms can also serve to creatively optimize and thus dynamically normalize antecedents and rule consequents. Creative optimizations may be created by pairing non-deterministic rule consequents having a common antecedent such that the direction of optimization is always toward the more likely to be valid.

The following is a written example of a creative transformation:

Rule 1: {airplane, explosives, terrorists}→(al-Qa'-ida used TNT to bring down a commercial airliner)

Rule 2: {airplane, bombs, terrorists}→(al-Qa'-ida used TNT to bring down a commercial airliner).

The fact that both rules 1 and 2 have the same consequent, leads to the following:

{airplane, explosives, terrorists}←→{airplane, bombs, terrorists}.

Note that one cannot necessarily generalize to: {explosives}←→{bombs} because of the loss of set context, which here includes airplane and terrorists. Suppose that the following production rule is used:

{airplane, explosives, lighters, terrorists}→(Issue a Red Alert).

Then, it follows from the rules above that it is possible to correctly induce the production rule: {airplane, bombs, lighters, terrorists}→(Issue a Red Alert). Were this deemed to be incorrect, the user would be queried to find the correct consequent and supply it as a new phrase association. It is noted that an advantage of this methodology is that it can be used to induce context-sensitive knowledge.

The following is another example of how transformation rules may be generated. Let, Ri and Rj be two distinct rules, where Rj is the more valid of the two i.e., on top, such that the antecedent of Ri, denoted RiA, is such that RiA < >RjA (or the rules would not be distinct) and the consequent of Ri, denoted RiC, is such that RiC=RjC. Then, it is possible to induce a creative transformation rule, Tk: RiA→RjA. For example, R1: {1, 2}→(4 3 4) and R2: {1, 3, 5}→(4 3 4) induces the creative transformation rule, T1 {1, 2}→{1, 3, 5}. Creative transformation rules may not be right recursive. For example, the right-recursive transformation rules, {1}→{1}, {1}→{1, 2}, or {2, 3}→{1, 2, 3} may not be applied because the set on the left is embedded in the set on the right. Moreover, the creative transformation rule, {1, 3}→{1, 2, 3} may not be applied because it is also a right recursive set. This is easy to check for prior to the generation of a creative transformation rule. Sequentially normalized insert (INS) and erase (ERA) commands, if any, along with their monadic arguments, must be the same and in the same sorted order) in each of a pair of consequents if they are to be properly equated.

The following is another example of how creative optimizations may be generated. Let, Ri and Rj be two distinct rules, where Rj is the more valid of the two i.e., on top, such that RiA=RjA and RiC <>RjC (or the rules would not be distinct). It is noted that this defines a non-deterministic rule pair. Then, it is possible to induce an optimization rule. This provides: RiC→RjC. For example, R1: {1, 2}→(4 3 4) and R2: {1, 2}→(3 4 5) induces the optimization rule, O1: (4 3 4)→(3 4 5). The optimization rules are independent of the hierarchy rules. Optimization rules may not be right recursive. For example, the right-recursive optimization rules, (1)→(1), (1)→(1 2), or (2 3)→(1 2 3) may not be applied because the sequence on the left is embedded in the sequence on the right. However, the optimization rule, (1 3)→(1 2 3) may be applied because it is not a right recursive sequence. This is easy to check for prior to the generation of an optimization rule.

Thus a KASER system can amplify a knowledge base. A KASER system represents an advance in the design of intelligent systems because of its capability for symbolic learning and qualitative fuzziness. In a conventional expert system, the context may cover the candidate rule antecedent, in which case an agenda mechanism is used to decide which matched rule to fire, e.g., most-specific match, first to match, chance match. The KASER system follows the same rule-firing principle as a conventional expert system; however, only the pattern-matching algorithm is necessarily more complex and embeds the conventional approach as its degenerate case.

In order to transmit and receive information back and forth between the user and the KASER system in a synergistic manner, a novel graphics-user-interface (GUI) has been designed. It is noted that the GUI plays an important role in supporting learning for the KASER through the user. In fact, this synergy accelerates learning through visualization. As a non-limiting example, the techniques described are useful for an associative memory GUI for the Type 2 KASER.

The purpose of the present technique is to provide a GUI in accordance with a GUI user interface philosophy which facilitates information exchange with the user. The GUI user interface philosophy focuses on a desired user interaction and user access to computer functions according to a GUI design methodology.

The GUI design methodology serves the goal of being able to rapidly enter contexts, rule antecedents, and rule consequents for processing by the rule-based KASER expert system. This enables the present system to be most effectively used by a single user or a team of analysts.

A problem addressed by this methodology pertains to the selection of semantic (normalized) phrases based on natural language conceptual specification for use in the loading of a context for a KASER decision support system. A corrective action may similarly be specified for use in training the KASER. There will typically be far too many phrases to enable the efficient linear (lexicographic) search through the phrases for a semantic match. This methodology addresses the problem of how to rapidly retrieve the desired semantic phrases in real-time for contextual specification. At the same time, semantic uniformity enables creativity in the KASER once linked to this GUI.

Rule predicates are maintained in a move-to-the-head list ordering. Antecedent predicates are features, while consequent predicates are procedures. This needs to be a learning system as follows. The algorithms need to run fast too and be able to be run on parallel hardware.

Menu and Screen Display

FIG. 1 is a diagram showing a non-limiting example of a GUI in accordance with an embodiment of the present technique. The display will comprise a PC LCD screen or a wall-sized touch screen 100, depicted in FIG. 1. At top (below the window bar) are six text fields 111, 112, 113, 114, 115, 116. These are user input text bars, so that the user would insert the desired text in these fields 111-116 in accordance with the item to be searched. Fields 111-113 appear on the left, and are used to display keywords and key phrases. Fields 114-116 appear on the right are used to display a list of possible action phrases (AP). It is noted that, while six text fields are given in the example, a different number of text fields may be provided. Also at the top, near fields 111-116 are entry control buttons, comprising "Add" button 121, "Conceptual Constraints" button 122, "Literal Constraints" button 123 and "Clear" button 124.

The entry control buttons, such as buttons 121-124 may be engaged in any convenient manner consistent with the physical operation of the GUI, such as touch screen, mouse click, keystroke or special purpose keypad. Similarly, selection of one of the text fields 111-116 for action or modification by buttons 121-124 are performed according to the physical operation of the GUI 100.

Below text fields 113-116 are Contextual Keywords and Phrases (CKP) menu 131 and Action Phrases (AP) menu 133. CKP menu 131 and AP menu 133 have corresponding label fields, which are CKP label field 137 and AP label field 139. By pressing one of the control buttons 121-124, action is taken with the entries in text fields 111-116. "Add" button 121 causes the selected field to be added to the corresponding CKP menu 131 or AP menu 133 below the particular text field 111-116. In the example of FIG. 1, text fields 111-113 are associated with CKP menu 131 and text fields 114-116 are associated with AP menu 133. As described, the GUI interacts with the program software, in this case a KASER engine, to accept or decline entry of the fields from text fields 111-116 into the corresponding CKP menu 131 or AP menu 133. Label fields 137, 139 display a generic label for the hierarchies displayed in the respective CKP and AP menus 131, 133.

Below the CKP menu 131 and AP menu 133 are context text field 151 and action text field 153. The selection of entries from CKP menu 131 and AP menu 133 result in entries from those menus 131, 133 moving text into respective ones of the context text field 151 and action text field 153. Undo buttons 161, 163 allow the user to decline the selection of entries into fields 151, 153. This can occur when entry was selected automatically or was manually selected. Undo buttons 161, 163 removes (undoes) one menu entry at a time from right to left. This function may be thought of as a conceptual undo, which serves to prevent many types of errors that would otherwise occur. A display of the probability of action being valid 169 is provided in percentage to indicate a confidence level of the context and action in fields 151, 153.

Buttons below text fields 151, 153 include "Save" 171, "Submit" 172, "Delete" 173, "Explanation" 174 and a help button 179. "Save" 171 has an effect of saving a rule. "Submit" 172 has an effect of submitting a context for possible rule action by way of pattern matching using a most-specific agenda mechanism as discussed below. "Delete" 173 deletes a previously saved rule. In an example configuration, "Explanation" field 174 is able to provide a metaphorical explanation of the entries in fields 151, 153. The explanation generates one or more metaphors by converting the items to a sequence of phrases using a GUI reverse hash. Transformed contexts and fired rules containing them are then output.

It is desired to minimize the number of general creative transformations of the context so as to minimize the introduction of combinatoric error. Such error is minimized as follows. The search is initialized to report an unsuccessful match as discussed below. The rule base is first combed by the initial untransformed context for a most-specific matching rule. If successful, the current context and the topmost row number of the most-specific rule are saved. Next, a most-specific creative transform of the context is made, if any. The search for a most-specific matching rule is repeated, starting with the sorted result of each subsequent creative transformation of the context. The current transformed context and the topmost row number of the most-specific rule overwrite the previously saved pair just in case the matched rule is more specific, or the new row number is closer to the head of the array than the previously saved one for the same degree of specificity. This process terminates upon not being able to further creatively transform the context, hitting a cycle in the transformed context, or upon receiving an interrupt to transmit the best result available at the time. In all cases, a most-specific rule, if any, that is closest to the head of the array is returned to be fired. The linear search for a first most-specific rule can be parallelized over several processors, if so designed. Here, each acyclic creative transformation of the context allows for a staggered parallel search for a best match as was just defined.

The fields and buttons above these menus serve to filter their contents. The context and action textboxes below these menus are iteratively defined using AP menu selections. Successive constraints are not performed on the associated menu until the associated button is clicked. A "Clear-All-Fields" button is not shown, but may be implemented if deemed useful. The rule action is a sequence of action phrases. Maximal reuse of previously used keywords and phrases facilitates retrieval and semantic specification. Keywords and phrases are only added as necessary. Selected keywords or phrases are inserted at the point of the blinking cursor. Sub-menus will not be used. Rather, the contents of each pull-down menu will be dynamically ordered upon use to best reflect their relevance to natural language constraints and/or keywords, phrases, or even letters and/or their probability of selection based on the usage history. The possibility field and metaphorical explanation button are for future expansion at this time.

All predicates bi-directionally translate to/from a unique integer identification through the use of a hash table. A predicate phrase, once created, can only be destroyed through a least-recently-used (LRU) mechanism. Once a predicate phrase is expunged, its unique integer ID is to be reused. A separate hash table holds antecedent (i.e., keyword and key phrases) and consequent (i.e., action phrases) predicates. Predicates having a positive sign suffix augment the context. Similarly, such predicates having a negative sign suffix will erase from the context the exact same predicate having an implied positive sign suffix, if present. Only such signed consequents may modify the context on the next iteration. The predicate matching processes will not find positive sign suffixes when matching the context (predicates having negative sign suffixes are self-erasing). This effects truth maintenance operations (i.e., retracting or replacing assertions and conclusions that are no longer true). Of course, consequent predicates may pose questions—the answer to which will modify the context via user (or possibly procedural) interaction.

The pull-down menus are ordered from most-frequently-used (MFU) to least-frequently used (LFU). New entries are inserted at the top and the LFU ones are deleted from the bottom, but only to free space as needed. While it has been shown that the method-of-transposition is more efficient than the move-to-the-front method, the latter is used for update in view of the principle of temporal locality. That is, having been recently referenced greatly increases the probability of a reference in the immediate future. A logical array-based pointer system is used for the update.

Lowercase letters are not case sensitive. Moreover, the user iteratively enters zero or more predicate substrings for an implicit conjunction. This iteratively filters the predicate list in a pull-down menu.

This process could result in too many entries or too few in the resultant pull-down menus. Then, the only recourse the user has is to iteratively retype a different set of keywords in the hope of getting it "correct". This process is laborious and thus time-consuming and hence is deemed to be unacceptable in view of the need for rapid predicate specification. Nonetheless, when used judiciously and sparingly, this filter can be advantageous.

By way of example, if one states, must contain, "TNT and terror", it might list such things as, "Terrorist uses TNT to blow up . . . ," or "TNT found in suspected terrorist camp," etc. These constraints act as a filter on the presented items in the pull-down lists. This example shows an instance of a set in which order is not important. In contrast the procedures and the order of procedures have significance.

Extending the example, consider the phrase, "The Taliban used TNT to bring down a commercial airliner." The phrase would not be retrieved by the literal constraints, {explosives, terrorists, airplane}, although clearly it should be. Another associative recall would be, "A shaped charge was dropped on a tank and exposed the populace to shock and awe". Here, "shaped charge" derives from explosives, "shock and awe" (in this instance) derives from terrorists or actions of terrorists, and "dropped" weakly derives from airplanes. It is noted that these derivations must be learned from use; not from a preloaded dictionary.

A problem with generalization is that beyond a single predicate, it rapidly loses validity through the generation of improper combinations.

General Configuration

The example GUI depicted in FIG. 1 provides a means for rendering logical associations, and includes means for displaying a received semantic concept in an input field, means for displaying a menu display of a set of semantic concepts, and means for displaying an output in the form of a semantic concept derived from the set of semantic concepts in the menu display.

Figure 2:
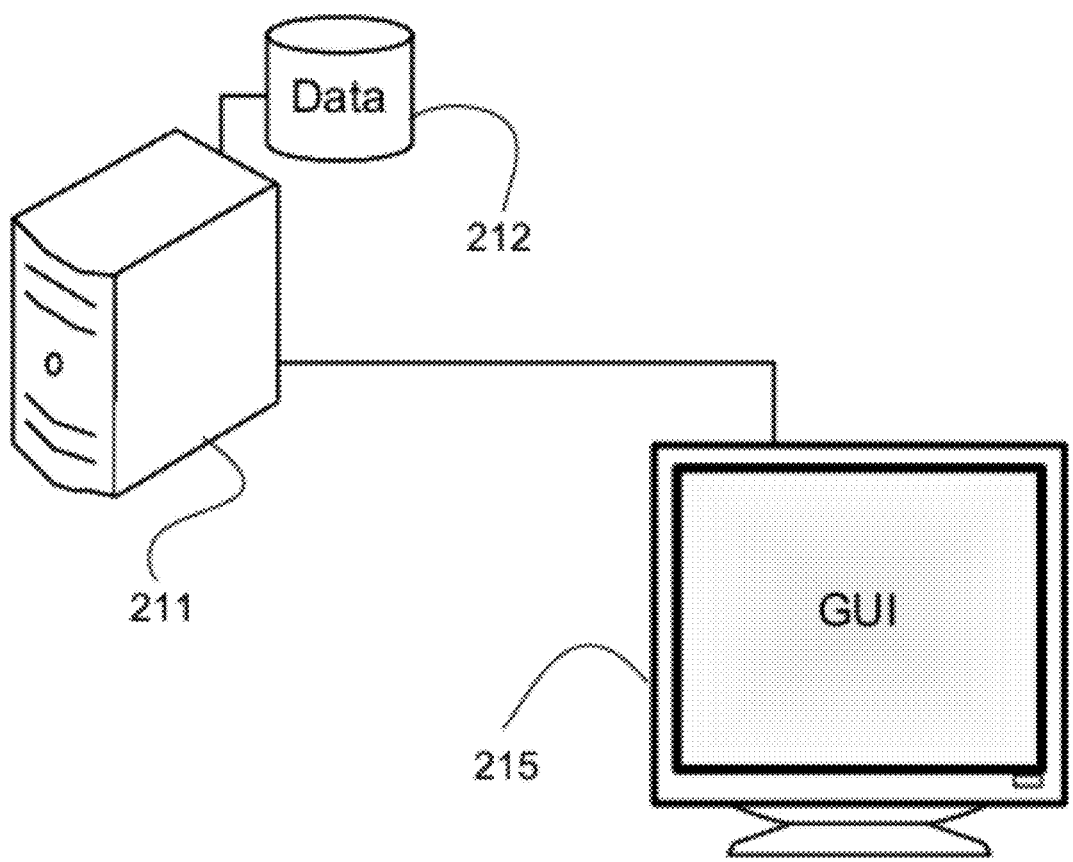
FIG. 2 is a diagram showing a configuration of a computer system using the GUI.

FIG. 2 is a diagram showing a configuration of a computer system using the GUI. Depicted are a computer 211, which stores data in data store 212 and uses display terminal 215 as a GUI, such as depicted in FIG. 1. Referring to FIGS. 1 and 2, the GUI provides means for inserting the received semantic concept into a set of rules. This is achievable by associating the received semantic concept with the set of semantic concepts in first and second menu fields, and provides a set of rules comprised of elements of the first and second fields.

The determination of a set of proposed rules in a set of rules is achieved by a computer system, computer system 211. Computer 211 provides means for determining a placement of the proposed rules in the set of rules in accordance with at least one of the semantic concepts and the semantic consequents and displaying the set of rules in an order corresponding to the determined placement in the first and second menu fields. Computer 211 further provides means for responding to the request to issue rules by applying the rules in the hierarchy in accordance with semantics in the information in the request, in which the hierarchy may be stored in data store 212. Display 215 provides the GUI and provides means for providing an output of one of the rules or the result of the application of the rule as the first and second output displays. Computer 211 further provides means for using a user selection from a corresponding one of the first menu and a second menu to render the displayed output as a first displayed output and to render a second displayed output, wherein the first and second displayed outputs correspond to respective semantic concepts taken from the first and second menus.

The GUI provides means for displaying the semantic concepts and consequents and permitting user selection of the semantic concepts and consequents, which are displayed in the fields and menus within the GUI. Computer 211 provides the association of the rules and consequents which are selected by the user or in accordance with their semantic relationships. This in turn provides means for providing an output of the rules.

The GUI Design

As indicated above, the diagram of FIG. 1 depicts an example graphical user interface (GUI). The depicted example is useful in setting forth the details of the GUI system and the expected actions when using the GUI. All contextual and action predicates bi-directionally translate to/from a unique integer ID through the use of separate hash tables (associative memories). Hash table load factors are kept below 50 percent to minimize collisions and thereby reduce fetch time. If more than 50 percent of the available hash memory is used, average retrieval time may proportionately slow down. Whenever a hash table load factor equals or exceeds 50 percent, the bottommost five percent of the KASER rules will be expunged, the frequency use counts and (reverse) hash tables for the involved CKP and AP predicates will be updated, and all resulting unreferenced or "dangling" predicates will likewise be expunged.

A percentage of table size is set for block deletion (garbage collection), which will be large enough to prevent thrashing, while small enough to preserve as much of the KASER knowledge base as practical. Thrashing may occur if the block deletion is too small because excessive overhead is used for deleting one rule or a few rules; however if too large of a block is deleted, useful rules are lost unnecessarily. Open addressing hash tables store the records directly within the array, where in double hashing, the interval between probes is computed by a second hash function. Double hashing has a considerable advantage over linear probing. It is noted that if the hash table stores large records of about five or more words per record, chaining uses less memory than open addressing. Chaining, unlike open addressing, requires extra indirection for external storage. In summary, double hashing is to be preferred to direct chaining where the records are small enough to preclude the use of external storage.

Keywords and Phrases

One hash table holds antecedent (i.e., Contextual Keywords and Phrases (CKP)) and the other consequent (i.e., Action Phrases (AP)) predicates. Clearly, double hashing is to be used for the CKP menu and if the abstract is included in the hash, then direct chaining is the appropriate hash method for the AP menu, when random access memory (RAM) is limited. As mentioned before, once a predicate phrase is expunged from the KASER rule base and hence the GUI; its unique integer ID is to be reused (e.g., through the use of a stack mechanism).

A random (direct) access Java database will be used to incrementally maintain updates to data structures stored in RAM on secondary memory (e.g., for reloading). This may not significantly slow down processes executing in RAM and only updates during detected idle periods and just prior to system shutdown, as necessary.

The words INS and ERA are reserved and result in automatic modification of the context textbox with the word or phrase that follows (these reserved words are delimited by a space and the phrase that follows is delimited by a comma), which enables subsequent inferences to be automatically made. These two reserved words are hard coded and are always the first two words in the initial AP menu by default.

Predicates prefixed by INS will augment the context. Similarly, such predicates prefixed by ERA will erase from the context the matching predicate, if present. Only such prefaced consequents will automatically modify the context on the next iteration of the inference engine. This process of insertion and erasure effects truth maintenance operations (i.e., iteratively retracting or replacing assertions and conclusions that are no longer valid as a result of rule actions). Of course, consequent predicates may also pose questions—the answer to which will modify the context via user (or in theory procedural) interaction.

A single AP consequent may specify an arbitrary number of INS and ERA commands, which will be executed in sequential order from left to right. The context may not contain redundant integers, since it is a set.

For example, the contextual set placed in numerical order using Quicksort to facilitate search operations which use bisection search, might be, {1, 34, 35, 41, 897}. Quicksort is a sorting algorithm developed by C. A. R. Hoare, and uses pivot values of subsets to efficiently sort values. Next, a fired rule action might be: ERA suspect is a terrorist. Here, the quoted phrase is taken from the AP menu. If this phrase had been hashed to the integer say, 41, then ERA 41 will change the context to, {1, 34, 35, 897}. It is permissible to attempt to erase an integer not present. This will simply result in an "identity" operation with no messages produced. The use of the INS reserved word is similar.

The specification of the Context and Action textboxes are performed through selection from (insertion into) the CKP and AP menus, respectively. Direct keyboard entry into the Context or Action textboxes is never permitted and will result in a dead key and beep sound, along with the pop-up messages, "Use CKP/AP Menu or Add Field/Button to Make Entry", if violated. This message displays just CKP for the contextual textbox error, or AP for the action textbox error.

The reason for this strict requirement to go through the menus to enter context and/or action text is to maximize reuse, thereby enabling the KASER system's creativity. The Context and Action textboxes scroll horizontally to accommodate any length entry. The CKP and AP menus similarly scroll horizontally as well as vertically. They are separated by a divider max bar, which allows the menu in use to expand and cover the one not in use. This serves to facilitate the viewing of the longer phrases in either menu. The presented (sub) CKP list is to be sorted using Java's built-in Quicksort for efficiency with scale.

The (sub) AP list is not sorted because its MFU-ordering is deemed to be more useful. The Context Undo button deletes one integer conjunct at a time (where the CKP menu entry is defined by the CKP integer hash table) from right to left. The Action Undo button deletes one concatenated integer Action Phrase at a time (where the AP menu entry is defined by the AP integer hash table) from right to left. These operations can result in dangling menu entries, which are deleted if they were just created for this insertion and thus are not already present in the rule base.

The left-hand-side of the top three buttons pertains to the CKP menu while, the right-hand-side of these buttons pertains to the AP menu.

The Clear button will clear the top six textboxes when clicked, or alternatively just that textbox where a blinking cursor lies. One can also backspace one character at a time within the top six textboxes to selectively clear them. The border surrounding each of the eight textboxes will flash when in use.

Entering text on either side of the Add, Conceptual Constraints, or Literal Constraints buttons will automatically clear all text from the corresponding opposite side of those buttons. The eight textboxes scroll horizontally to accommodate any length entry.

In addition, the Clear button will clear the Context and Action textboxes as well as the Possibility metric when clicked, or alternatively just that textbox (and Possibility metric) where a blinking cursor lies. One cannot backspace one character at a time within a Context or Action textbox to clear it. The system enforces this constraint using a beeping dead key. Any attempt to directly enter text in either of these two textboxes will result in the pop-up message, "Use CKP Menu/Add Field Button to Make Entry", or "Use AP Menu/Add Field Button to Make Entry" as appropriate. The Undo buttons must be used for the purpose of deletion. In this manner, possible fragmentation of the contents of the Context and Action textboxes is prevented.

The textual entries associated with the Add and Conceptual Constraints buttons may be preprocessed by a commercial, royalty-free (Java-based) spell and grammar checker prior to menu insertion.

Again, the Add button is used to make an entry into the CKP or AP menu, as appropriate, but, ideally only as semantically necessary (i.e., when a word or phrase having the same meaning is not already present). Syntactically duplicate entries are never permitted and if attempted, the pop-up menu, "Duplicate Entries are Not Permitted" is issued. In this case, the Add and Conceptual Constraint textboxes are automatically cleared. Whenever a CKP phrase is selected or successfully added to the menu, it is simultaneously appended as a conjunction (separated by commas) at the right of the Context textbox. Similarly, whenever an AP phrase is selected or successfully added to the menu, it is simultaneously concatenated, separated by commas, at the right of the Action textbox (otherwise, why add it to the AP menu?). This implies that CKP and AP menu entries are checked at the time of their creation to be sure that they do not contain any commas. If they do, they are automatically stripped out with the message, "# Commas Found and Removed." issued to the user.

Every AP points to an abstract unless empty, which is entered/viewed through a pop-up textbox and again resides in RAM. This abstract is made available to a multimedia system, where it will be presented beneath the fired rule consequent in front of the appropriate image background, when the touch-screen is tapped. It is noted that the allowance for a concatenation of actions results in non-determinism in the induced rule base. New menu entries are tagged with one or more conceptual constraints, although not every entry need be tagged.

Again, conceptual constraints may also be added to existing menu entries. For example, "computer" and "food" are two very different conceptual constraints on "apple". The conceptual constraint, "computer" would have been added in the 1980s subsequent to the release of the "Apple McIntosh". It is noted that "computer", but not "food" is a conceptual constraint on "Apple".

Clicking on the Add button will insert the associated text into the appropriate menu if it is not already present there. Otherwise, this button will operate the same as if the existing entry had been selected from the appropriate menu. It is noted that "may" and "May" and the like are distinct case-sensitive entries. If the Add textboxes are both empty, the pop-up message, "Add Textbox May Not be Empty" will be issued.

Otherwise, if the Conceptual Constraint textbox below it is not empty and contains new title(s) delimited by commas, but not spaces to allow for the inclusion of phrases, then they will be added to the hash and reverse hash of the text associated with the Add button, as necessary. That is, titles not presently hashed will be inserted into the hash and reverse hash tables. Titles manually deleted from this textbox will similarly be detected as missing and thus expunged from the appropriate hash table. They will be expunged from the appropriate reverse hash table if they would otherwise become dangling pointers. Menu entries are similarly expunged when they are no longer used by any rule in the KASER rule base—as evidenced by their frequency use counts falling to zero. All frequency use counts are to be maintained as a tagged field using hashing. The deletion of a menu entry can result in a dangling conceptual constraint.

Multiple successive clicks of the Add, Conceptual Constraints, or Literal Constraints buttons will result in no further action (i.e., unless there is a change in an associated textbox). Similarly, multiple successive clicks of the Clear, Metaphorical Explanation, Save, Submit, Delete, and Help buttons will be without effect.

The Conceptual Constraints button is used to categorize and thus filter the entries in the associated menu. Again, menu entries should be tagged with conceptual constraints when added, or whenever deemed appropriate to facilitate subsequent retrieval. The relationship between menu entries and conceptual constraints is many to many. For example, the CKP entry "red" might be assigned the two conceptual constraints; namely, "colors", "flag colors". Hashing on "red" would bring up these two titles without repetition (i.e., redundancy). Reverse hashing on "flag colors" would bring up "blue", "red", and "white" (in lexicographic order).

It is noted that machine search is predicated on an integer ordering. Menu items may be selected with a left-click or deleted with a right-click (i.e., Windows protocols). Alternatively, when using a touch-screen, one tap is used to select a menu item and two taps to delete a menu item. Two taps will bring up a confirmation box (e.g., "Are you sure you want to delete, 'name'?"). Again, a title is to be deleted when all of its associations are deleted and otherwise updated for each deletion—all through the efficient use of hashing. The system checks a menu entry, whenever it is updated with new conceptual constraints, to update the hash and reverse hash tables as appropriate (maintaining separate hash and reverse hash tables for the CKP and AP menus—for a total of four hash tables plus the two integer and reverse integer translation hash tables). Such compilations, unlike linked-list associations, save on runtime, which is critical to the efficient use of the GUI with scale. Reverse hashing on an unknown title will have no effect on the presented menu entries (except to list the unknown words or phrases in a pop-up box for the CKP or AP menus with, "The Following CKP (AP) Titles are Unknown."). CKP was used for the left menu and AP for the right one. Multiple titles are implicitly OR'd and their results are presented in union in the appropriate pull-down menu.

Titles are not to be recursively treated as CKPs or APs themselves. To do so would make it impossible to specify an initial conceptual constraint. Conceptual constraints are simply added to, or expunged from, the hash and reverse hash tables, as necessary, when the Add button is clicked to enter the non-empty contents of its associated textbox. For example, the title, "car" will enable the user to find the base entry say, "1929 Porter" above that of, "Contents of Address Register (CAR)". Observe the importance of having the user be specific in the specification of titles (e.g., use "automobile" in lieu of, or at least in addition to, "car"). It is noted that literal constraints, if any, are independent of and operate subsequent to the effects of conceptual constraints.

Whenever an entry is selected from a menu, it will replace the contents of the appropriate textbox associated with the Add button and its conceptual constraints, if any, will be listed, in lexicographic order, immediately below. This affords the user the chance to add (and/or delete) one or more titles, which are then linked to (de-referenced from) the hash and reverse hash tables by clicking on the Add button as before. Any known titles will be quickly discovered and ignored. The number of entries produced in the appropriate menu is updated when appropriate and shown at the center-top of the menu (or twice—once at the left and once at the right, where the active menu overlays the inactive one). These integers provide the user with feedback, which supports the user in specifying better filters.

The literal constraints "X" followed by a comma delimiter, then a "Y" would iteratively constrain the appropriate resultant pull-down menu entries to include both case-sensitive letters "X" and "Y" in any order when the Literal Constraints button is clicked. Lowercase letters are not case sensitive. Substrings may include spaces, but not commas, which serve as delimiters. The user iteratively specifies zero or more substrings. Multiple literal constraints are implicitly ANDed and their results are presented in intersection in the appropriate pull-down menu. Literal constraints, akin to conceptual constraints in this respect, are not treated as CKPs or APs and thus are not inserted into these menus. Literal constraints are, of course, not subject to spelling or grammar checks.

For example, if one states an AP must contain, "TNT", "terror", it might list such things as, "Terrorist uses TNT to blow up . . . ," or "TNT found in suspected terrorist camp". Again, the literal constraining process is in addition and subsequent to that of the conceptual constraints, if used above it. Clicking on the Literal Constraints button will automatically perform a Conceptual Constraint if the corresponding title textbox of the latter is not empty and has not been previously clicked. Conversely, clicking on the Conceptual Constraint button will never automatically fire the Literal Constraints.

The Possibility is a statistic, computed by the KASER, that refers to the chance that a non-validated rule is actually valid (validated [Saved] rules are assigned a 99 percent possibility, by definition). It is cleared whenever the lower Clear button is pressed, or whenever the contents of the Context or Action textboxes changes for any reason (i.e., other than a new rule being specified [Save button], or a rule being fired upon successful return [Submit button], of course).

The Metaphorical Explanation button brings up a textbox that shows the sequence (in words) of transformation rules supplied by the KASER, if any, that were applied to the context to ultimately fire the shown rule along with its Possibility. Only the context supplied by the GUI (in words) and the fired KASER rule (in words) is shown if no transforms were applied. Otherwise, the applied transforms are shown in sequence sandwiched in between these two along with their possibilities at each step, where supplied by the KASER.

The Submit button will send a non-empty GUI-supplied context to the KASER, which in turn will supply an action, if successful, for the user to adjudicate. An empty context textbox will cause the pop-up message, "Context Textbox Can Not be Empty" to be issued. Clicking on the Submit button will initially clear the Action textbox and its associated Possibility metric before forwarding to the KASER. The integer contextual set presented to the KASER is numerically sorted using Quicksort or its equivalent. The integer action sequence, received from the KASER, is to be hashed back into text for presentation to the user in the Action textbox, as previously described. Any INS or/and ERA command(s) is (are) implemented on the Context, but not shown.

It is noted that the set of keywords for multimedia retrieval is synonymous with the supplied context subsequent to its transformation, if transformation was used to fire a KASER rule. Notice that the supplied set of multimedia keywords may thus be a superset, which covers the fired rules antecedent. This will facilitate retrieval of the most-specific multimedia. Moreover, the multimedia system may process the fired rule consequent and its associated abstract, if supplied, to elicit further information. All available information must be included in each and every search for appropriate multimedia content (i.e., to avoid over-generalizing and thus incurring too many 'hits'). This process is to be automated and perhaps pre-saved in the multimedia system to allow for real-time selection and retrieval of multimedia content.

The Save button saves a validated rule in the KASER rule base after checking for non-redundancy there. If the hashed, sorted, non-empty GUI context's textbox (i.e., an empty textbox here cannot be matched by definition) exactly matches an antecedent in the KASER rule base, then the rules consequent will be overwritten with the distinct user-supplied non-empty Action textbox. Again, an empty Context textbox will cause the pop-up message, "Context Textbox Can Not be Empty", to be issued. Similarly, an empty Action textbox will cause the pop-up message, "Action Textbox Can Not be Empty", to be issued.

The Delete button deletes an exactly matching rule from the KASER rule base (there can be at most one) and reports success, or reports that the rule was not found. A successful delete will update menus, hash, and reverse hash tables (and the two bidirectional integer hash tables) as necessary to remove otherwise dangling references. This will also result in the deletion of any associated abstract for the rule consequent when the frequency use counts for these AP menu entries goes to zero.

The Help button is simply a textual End-User How-to-Guide, which covers how to use the system. It links to an external .txt (.doc) file, which can be readily and independently updated. Indexed search (e.g., Windows Help) will be included in future development.

The resulting GUI has distinct advantages in enhancement of communication in the computer user interface environment. This is advantageous when providing an interface between a user and a cognitive system. During the learning process, the user can pose questions or supply information through the GUI.

Through this system, the learning process is accelerated, as visualization is used to provide information to the user and retrieve knowledge from the user in a symbiotic human-machine relationship.

The realization of the system interface provides well-documented benefits of diagrammatic displays for human information processing and knowledge acquisition, such as, shifts to top-down information processing strategies and enhanced recall, while alleviating adverse effects evident in confusion and motivational disengagement arising from complex diagrammatic displays.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A computer system comprising:
    a computer;
    a data store operatively coupled to the computer, wherein the data store is configured to store a listing of rules, each rule comprising an antecedent and a consequent, wherein the rules are hierarchically ranked in order of validity, and wherein the computer is configured to automatically generate and add new rules to the listing of rules by transforming and optimizing the existing rules in the listing; and
    a graphical user interface (GUI) display operatively coupled to the computer, wherein the GUI display comprises:
    a first field configured to display a user-entered antecedent;
    a second field configured to display a user-entered consequent;
    a conceptual constraint field configured to display user-entered text;
    a first menu configured to display a computer-generated hierarchical list of antecedents from the listing of rules in the data store that are conceptually constrained by the user-entered text displayed in the conceptual constraint field;
    a second menu configured to display consequents corresponding to the antecedents displayed in the first menu, wherein the rules in the data store are of the form $\{i, j, k, \ldots\} \rightarrow (u\ v\ w)$, wherein the antecedent comprises a non-empty, sorted set of distinct positive integers and the consequent comprises a non-empty sequence of positive integers, and wherein the positive integers are translated to and from textual menu equivalents which are displayed in the first and second menus through the use of hash tables;
    a third field for displaying one of the antecedents listed in the first menu; and
    a fourth field for displaying a corresponding consequent of the antecedent displayed in the third field, whereby a user selection from either the first menu or the second menu renders a display in the third and fourth fields.

2. The computer system of claim 1, wherein the computer is configured to transform existing rules in the data store into new rules by:
    searching the listing of rules in the data store for first and second rules, wherein the first and second rules have distinct antecedents and equivalent consequents; and
    creating a third rule having the same antecedent as the first rule and a consequent equal to the antecedent of the second rule.

3. The computer system of claim 2, wherein the computer is configured to optimize existing rules in the data store to create new rules by:
    searching the listing of rules in the data store for fourth and fifth rules, wherein the fourth and fifth rules have equivalent antecedents and distinct consequents; and
    creating a sixth rule, the antecedent of which is equivalent to the consequent of the fourth rule and the consequent of the sixth rule is the same as the consequent of the fifth rule.

* * * * *